United States Patent [19]

Saito et al.

[11] 4,132,749
[45] Jan. 2, 1979

[54] VINYL CHLORIDE SERIES RESIN BLEND COMPOSITIONS

[75] Inventors: Ichiro Saito, Kobe; Kazuo Saito, Kyoto, both of Japan

[73] Assignee: Kanegafuchi Kagaku Kogyo Kabushiki Kaisha, Osaka, Japan

[21] Appl. No.: 699,782

[22] Filed: Jun. 25, 1976

Related U.S. Application Data

[63] Continuation of Ser. No. 181,218, Sep. 16, 1971, abandoned, which is a continuation-in-part of Ser. No. 757,133, Sep. 3, 1968, abandoned.

[51] Int. Cl.$^2$ ............................................. C08L 51/04
[52] U.S. Cl. .......................... 260/876 R; 260/29.7 R; 260/29.7 UA; 260/29.7 UP; 260/29.7 AT; 260/880 R
[58] Field of Search ....................... 260/876 R, 880 R

[56] References Cited

U.S. PATENT DOCUMENTS

3,287,443   11/1966   Saito et al. ........................ 260/876 R
3,557,251   1/1971    Tanaka et al. ...................... 260/876

FOREIGN PATENT DOCUMENTS

937747   9/1963   United Kingdom.

*Primary Examiner*—Thomas de Benedictis, Sr.
*Attorney, Agent, or Firm*—Moonray Kojima

[57] ABSTRACT

Vinyl chloride series resin compositions comprising (a) 90 to 50 parts by weight vinyl chloride series resins and (b) 10 to 50 parts by weight of graft polymers obtained by polymerizing (i) 20 to 65 weight percent butadiene series rubber, (ii) 20 to 50 weight percent vinyl aromatic hydrocarbon, (ii) 10 to 50 weight percent methyl methacrylate, (iii) 2 to 50 weight percent acrylic ester, and (iv) 0 to 40 weight percent acrylonitrile.

20 Claims, No Drawings

VINYL CHLORIDE SERIES RESIN BLEND COMPOSITIONS

This is a continuation of application Ser. No. 181,218 filed Sept. 16, 1971, now abandoned, which is a continuation-in-part of Ser. No. 757,133, filed Sept. 3, 1968, now abandoned.

BACKGROUND OF THE INVENTION

This invention relates to vinyl chloride series resin compositions, and more particularly to such compositions comprising a blend of vinyl chloride series resins and graft polymers.

Vinyl chloride series resins are, as is well known, excellent in weathering resistance, chemical resistance, tensile strength, heat resistance, heat stability, transparency, coloration, flame reistance, and so forth, but are relatively inferior in impact resistance and workability.

In an attempt to overcome these shortcomings, small amounts of butadiene polymer, acrylonitrile-styrene-butadiene polymer, or styrene-methyl methacrylate-butadiene polymer and other modifying resins have been added to vinyl chloride series resins. However, no significant amount of improvement has yet been achieved, prior to this invention. In some cases, even when these shortcomings have been reduced or eliminated, other disadvantages have been produced, such as for example, deteriorations in tensile strength, heat resistance, heat stability transparency, coloration, and other otherwise advantageous feature inherent to vinyl chloride series resins.

SUMMARY OF THE INVENTION

Therefore, an object of the invention is to provide compositions which possess advantageously excellent tensile strength, heat resistance, transparency, coloration, etc, and are not reduced in impact resistance, workability, etc. such as aforementioned are characteristic of vinyl chloride series resins.

Briefly, the invention comprises a composition comprising 10 to 50 parts by weight of a graft polymer and 90 to 50 parts by weight of vinyl chloride series resin selected from the group consisting of homopolymers of vinyl chloride and copolymers of above 70 weight percent vinyl chloride and below 30 weight percent of other monoolefinic monomers copolymerizable therewith. The graft polymer is obtained by polymerizing 20 to 65 weight percent butadiene series rubber, up to 50 weight percent vinyl aromatic hydrocarbon, up to 50 weight percent methyl methacrylate, up to 50 weight percent acrylic ester and below 40 weight percent acrylonitrile. The monomers may be first mixed together and then graft polymerized, or be added separately to the polymerizing system. The acrylic ester may be used in an amount up to 50 percent by weight of the total monomers weight and produce advantageous improvements in workability, impact resistance and tensile strength, and without reduction in heat distortion temperature. The butadiene series rubber is selected from the group consisting of homopolymers of butadiene and copolymers of butadiene in major proportions and other monoolefinic monomers copolymerizable therewith in minor proportions, with the rubber being in latex.

Advantageously, impact strength, tensile strength, heat resistance, workability, transparency and coloration are all substantially improved.

DETAILED DESCRIPTION OF PREFERRED EMBODIMENT

Butadiene series rubber is used in the form of aqueous dispersions (hereinafter called "rubber latex"), a state of their being suspended in water. The butadiene series rubber may be polybutadiene or copolymers of butadiene in major proportions and other monoolefinic monomers copolymerizable therewith in minor proportions, such as vinyl aromatic hydrocarbons, acrylonitrile, acrylic esters, etc. These compounds may be used singly or in mixtures of two or more. The butadiene series rubber comprises 20 to 65 percent by weight of the graft polymer, i.e. the total amount of the butadiene series polymers and the mixing monomers to be described hereinbelow in greater detail. When this amount is below 20 weight percent. the products are inferior in impact strength. When this amount is above 65 weight percent, the products are inferior in tensile strength and in transparency.

For the mixing monomers in the graft polymer, there may be used vinyl aromatic hydrocarbon, acrylic ester, methyl methacrylate and/or acrylonitrile.

The vinyl aromatic hydrocarbon may be for example, styrene, alpha-methyl styrene, vinyl toluene, etc and mixtures thereof. They are used in amounts up to 50 percent by weight of the graft polymer weight. When this amount is above 50 percent, the intended vinyl chloride series resin compositions are turbid in fluorescent colors. In the following examples, 20 to 50 percent by weight of the graft polymer were used with surprising effects, and attained intended results.

The acrylic ester may include, for example, methyl acrylate, ethyl acrylate, butyl acrylate, 2-ethyl hexyl acrylate, octyl acrylate, etc and mixtures thereof. The amounts used should be up to 50 percent by weight of the graft polymer. It was also found that when the amount was further adjusted to be up to 50 percent by weight of the total mixing monomers workability was improved without lowering heat distortion temperature. When the amount of acrylic ester is above 50 weight percent of the graft polymer, tensile strength and heat stability become inferior, and heat distortion temperature drops substantially in the intended vinyl chloride series resin composition. In the following examples, 2 to 50 percent by weight of the graft polymer were used with surprising effect.

Thus, there are two aspect to this invention. When the acrylic ester is in an amount of up to 50 percent by weight of the graft polymer, various properties such as impact strength, tensile strength, workability, etc are improved. When it is adjusted to be in an amount of up to 50 percent by weight of the mixing monomers which are graft polymerized with the butadiene series rubber, then the workability is improved together with the other properties without any reduction in heat distortion temperature.

The amount of methyl methacrylate should be up to 50 percent by weight of the graft polymer. When it is above 50 percent, the resultant product will impart yellowish turbidity, and would be inferior in coloration and transparency. In the following examples, 10 to 50 percent by weight of the graft polymer were used with attainment of the intended results.

Acrylonitrile should be used in an amount which is below 40 percent by weight of the graft polymer. When it exceeds 40 percent, the products are poor in their workability and heat stability. With the monomer combination of acrylonitrile and methyl methacrylate (i.e. without using the other essential elements vinyl aromatic hydrocarbon and acrylic ester), the product produced are inferior in coloration and transparency.

The graft polymers are obtained in the following manner:

Ordinary emulsion polymerization is used to obtain graft polymerization. Rubber latex is dispersed in an aqueous medium having an emulsifying agent dissolved therein, and stirred. A polymerization initiator and other agents are introduced into this system. A polymerization modifier may also be used. To this mixed system, the aforementioned monomers may be added, either as a mixture thereof, or the monomers may be added one component after another to obtain desired polymerization.

Various emulsion polymerization catalysts may be used, for example, organic and inorganic peroxides (such as cumene hydroperoxide, tertiary butyl hydroperoxide, ammonium persulfate, etc), or a combination of the aforementioned peroxides and reducing agents (such as formaldehyde sulfoxylate, etc), or azo-bis isobutyronitrile, and the like, etc.

As a polymerization modifier, for example, tertiary dodecyl mercaptane, dodecyl mercaptane, etc, may be used. As an emulsifying agent, for example, anionic surface active agents (such as salts of sulfonic acid, salts of fatty acids, etc) and non-ionic surface active agents (such as polyethylene glycol series, etc) may be used singly or in any combination thereof.

After graft polymerization is completed, the latex is removed, salted out, filtered, and dried to obtain the graft polymer.

A vinyl chloride series resin is blended with the graft polymer. The resin may be vinyl chloride polymer or copolymers of vinyl chloride and other monoolefinic monomers copolymerizable therewith (such as vinyl acetate, vinylidene chloride, acrylonitrile, etc and mixtures thereof) with the former being above 70 percent by weight.

The intended products are obtained by homogeneously blending the vinyl chloride series resin and the graft polymer. The blending may be performed by an ordinary method, such as by roll mixing, banbury mixing, or mixing in the form of latex, and like methods.

When compared with vinyl chloride series resins alone, or ordinary homogeneous compositions alone comprising no vinyl chloride and only graft polymers of butadiene rubber with vinyl aromatic hydrocarbon, methyl methacrylate and acrylonitrile, and without an acrylic ester; the vinyl chloride series resin composition of this invention possessed these advantages: (1) substantially improved impact resistance; (2) substantially improved workability; and (3) retention of the advantages inherent to vinyl chloride series resins, such as tensile strength, heat distortion temperature, coloration and so forth.

The invention is described hereinbelow with reference to the following examples:

EXAMPLE 1

Table 1

| Components (parts) | Graft polymer (a) G-1-1 | (b) Contrast G-1-2 |
|---|---|---|
| Polybutadiene (Part.Dia. 0.05μ) | 42 | 42 |
| Water | 200 | 200 |
| Methyl methacrylate | 21.2 | 23.2 |
| Styrene | 31.8 | 34.8 |
| Butyl acrylate | 5 | 0 |
| Tertiary butyl hydroperoxide | 0.22 | 0.22 |
| Sodium sulfoxylate aldehyde | 0.19 | 0.19 |

The graft polymer obtained by polymerization of the ingredients of components (a) is designated G-1-1. The contrast graft polymer obtained by polymerization under the same conditions as (a) but without acrylic ester is designated G-1-2. Their physical properties were measured by using test pieces obtained respectively by roll blending 15 parts by weight of graft polymer and 85 parts by weight of vinyl chloride resin (average polymerization degree of 800) at 160° C. for 10 minutes and then pressing the mixture at 170° C. for 30 minutes. The results are given in Table 2.

Table 2

| | | contrast | contrast |
|---|---|---|---|
| Vinyl chloride resin(parts) | 85 | 85 | 100 |
| | G-1-1 | G-1-2 | |
| Graft polymer (parts) | 15 | 15 | 0 |
| Impact resistance (23° C) (Kg.cm/cm²) | 15.4 | 11.2 | 3.7 |
| −30° C | 4.9 | 4.5 | 3.5 |
| Tensile strength (Kg/cm²) (20° C) | 478 | 480 | 490 |
| Elongation (%) (20° C) | 171 | 158 | 95 |
| Heat distortion Temperature (0° C) | 66.3 | 67.3 | 63.5 |
| Transparency (%) | 78.3 | 78.3 | 81 |
| Workability | | | |
| Gelation Speed(minutes) | 9.0 | 13.0 | 16.5 |
| Fluidity (cm³/sec) | $1.10 \times 10^{-2}$ | $0.92 \times 10^{-2}$ | $0.85 \times 10^{-2}$ |

Note:
1. Impact strength: Izod with notch (Kg.cm/cm²). The value is measured by A.S.T.M.-D256-54T.
2. Heat distortion temperature: The value is measured by A.S. T.M.-D648-56 under 18.6 kg load.
3. Transparency: It is represented by the value of the coefficient of transmission of visible light rays on a test piece of sheet of 3.4 mm tickness. The value is measured by JIS-K6714.
4. Gelation speed: The value is represented in time to be a constant value by brabender plast graph.
5. Fluidity: The value is measured by Koka type flow tester at 180° C.

As shown, the product obtained by addition of 5 parts by weight of butyl acrylate (8.6% by weight of the total mixing monomers) gave a marked improvement in its impact resistance and workability, and was nearly equal in its transparency as compared with the contrasts.

EXAMPLE 2

The products were obtained in the same way as in Example 1 by graft polymerization of the components given in Table 3 with the amount of butyl acrylate altered in amounts between 0 to 10 parts (0 to 17% by weight of the total mixing monomers), and then compared.

Table 3

| Components parts | Graft Polymer G-2-1 | G-2-2 | G-2-3 | Contrast G-2-4 |
|---|---|---|---|---|
| Styrene-butadiene Copolymer # (Part.dia. 0.1μ) | 42 | 42 | 42 | 42 |
| Water | 200 | 200 | 200 | 200 |
| Methyl Methacrylate | 26 | 25 | 25 | 31 |
| Styrene | 30 | 28 | 23 | 27 |
| Butyl acrylate | 2 | 5 | 10 | 0 |
| Cumene hydroperoxide | 0.22 | 0.22 | 0.22 | 0.22 |
| Sodium sulfoxylatealdehyde | 0.2 | 0.2 | 0.2 | 0.2 |

NOTE:
Copolymer consists of styrene 23.7 percent by weight and butadiene 76.3 percent by weight.

The graft polymers obtained are designated G-2-1, G-2-2 G-2-3 and G-2-4 respectively. Physical properties were measured by using test pieces formed under the same conditions as in Example 1. The results are given in Table 4. The vinyl chloride resin used had an average polymerization degree of 800. The physical properties described in Table 4 were measured by the same methods and conditions described in the notes of Table 2. As shown in Table 4, the products obtained with addition of 2 to 10 parts by weight of butyl acrylate gave a marked improvement in impact resistance and workability, and had a nearly identical transparency as compared with the contrast sample obtained without such addition.

Table 4

| | | | | Contrast | Contrast |
|---|---|---|---|---|---|
| Vinyl chloride resin (parts) | 85 | 85 | 85 | 85 | 100 |
| Graft polymer (parts) | G-2-1 15 | G-2-2 15 | G-2-3 15 | G-2-4 15 | 0 |
| Impact resistance (23° C) (Kg.cm/cm² (−30° C) | 22.3 5.6 | 24.9 7.8 | 25.3 7.9 | 17.7 5.4 | 3.6 3.5 |
| Tensile strength (Kg/cm²) (20° C) | 477 | 472 | 469 | 481 | 493 |
| Elongation(%) (20°) | 177 | 180 | 186 | 173 | 97 |
| Heat distortion temperature (0° C) | 66.3 | 65.8 | 63.4 | 66.8 | 63.2 |
| Transparency (%) | 73.1 | 73.1 | 72.8 | 73.3 | 81 |
| Workability gelation speed(min) | 9.2 | 8.7 | 8.2 | 13.8 | 16.3 |
| Fluidity (cm³/sec) | $0.96 \times 10^{-2}$ | $1.10 \times 10^{-2}$ | $1.31 \times 10^{-2}$ | $0.93 \times 10^{-2}$ | $0.84 \times 10^{-2}$ |

EXAMPLE 3

The graft polymers were manufacted in the same way as in Example 2 by graft polymerization of the components of Table 5. Varying amounts of butyl acrylate were used, such as 10,20,30,40 parts by weight (14,29,43,57 percent by weight respectively of the total mixing monomers). These graft polymers and polyvinyl chloride were blended and formed into test pieces, and their physical properties compared.

Table 5

| Components(parts) | Graft Polymers G-3-1 (parts) | G-3-2 (parts) | G-3-3 (parts) | G-3-4 (parts) |
|---|---|---|---|---|
| Syrene-butadiene copolymer # | 30 | 30 | 30 | 30 |
| Styrene | 40 | 35 | 25 | 20 |
| Methyl methacrylate | 20 | 15 | 15 | 10 |
| Butyl acrylate | 10 | 20 | 30 | 40 |

NOTE:
Copolymer is the same as in Example 2.

The graft polymers obtained are designated G-3-1, G-3-2, G-3-3 and G-3-4, respectively. The physical properties were measured by using test pieces formed under the same conditions as in Example 1. The results are given in Table 6. The vinyl chloride resin used had an average polymerization degree of 800.

Table 6

| Vinyl chloride resin (parts) | 70 | 70 | 70 | 70 |
|---|---|---|---|---|
| Graft polymer (parts) | G-3-1 30 | G-3-2 30 | G-3-3 30 | G-3-4 30 |
| Impact resistance (Kg.cm/cm²) (23° C) (0° C) | 51.2 13.1 | 60.4 15.0 | 60.6 16.8 | 90.7 17.2 |
| Tensile strength (Kg/cm²) (20° C) | 492 | 486 | 430 | 390 |
| Heat distortion temperature (° C) | 66.5 | 66.1 | 65.7 | 62.0 |

NOTE:
The physical properties were measured by the same methods or conditions as described in the notes of Table 2.

As shown above, sample G-3-4 obtained with butyl acrylate of above 50% (namely 57.3%) by weight of the total mixing monomers was slightly less in tensile strength and heat distortion temperature, but greater in impact resistance. The other three samples obtained with butyl acrylate of below 50% by weight of the mixing monomers, were superior in tensile strength, heat distortion temperature and impact resistance.

EXAMPLE 4

Polymers were obtained in the same way as in Example 2, by graft polymerization of the components of Table 7 with addition of butyl acrylate in 5 parts and 0 parts by weight. These polymers were blended with vinyl chloride resin. Their physical properties were compared using test pieces formed with these blends.

Table 7

| Componets (parts) | Graft polymer G-4-1 | G-4-2 | G-4-3 | Contrast G-4-4 | Contrast G-4-5 |
|---|---|---|---|---|---|
| Styrene-butadiene copolymer | 45 | 45 | 45 | 45 | 45 |
| Butyl acrylate | 5 | 5 | 5 | 0 | 0 |
| Styrene | 30 | 25 | 30 | 25 | 33 |
| Methyl methacrylate | 20 | 15 | 0 | 13 | 0 |
| Acrylonitrile | 0 | 10 | 20 | 12 | 22 |

The graft polymers obtained were designated G-4-1, G-4-2, G-4-3, G-4-4, and G-4-5. The test pieces were formed from 90 parts of vinyl chloride resin, of average polymerization degree of 800, and 10 parts of each graft polymer under the same conditions as in Example 1. Their physical properties were measured, and the results are give in Table 8.

Table 8

| | | | | Contrast | Contrast |
|---|---|---|---|---|---|
| Vinyl chloride resin (parts) | 90 | 90 | 90 | 90 | 90 |
| Graft polymer(parts) | G-4-1 | G-4-2 | G-4-3 | G-4-4 | G-4-5 |

Table 8-continued

|  | | | | | |
|---|---|---|---|---|---|
|  | 10 | 10 | 10 | 10 | 10 |
| Impact resistance (Kg.cm/cm$^2$) (23° C) | 70.3 | 71.2 | 75.6 | 30.2 | 36.7 |
| Tensile strength (Kg/cm$^2$) (23° C) | 565 | 580 | 597 | 590 | 599 |
| Heat distortion temperature (° C) | 72.4 | 73.1 | 73.9 | 73.1 | 73.3 |

NOTE:
The physical properties were measured by the same methods or conditions described in the Notes of Table 2.

As shown, the products, except the contrast ones, were superior in impact strength, tensile strength, and heat distortion temperature.

EXAMPLE 5

Polymers were manufactured by graft polymerization of the components of Table 9 using varying amounts and kinds of acrylic esters for example, butyl acrylate, lauryl acrylate and 2-ethyl hexyl acrylate.

Table 9

| Components (parts) | Graft polymer | | | Contrast |
|---|---|---|---|---|
|  | G-5-1 | G-5-2 | G-5-3 | G-5-4 |
| Styrene-butadiene copolymer (particle dia. 0.3μ) | 42 | 42 | 42 | 42 |
| Methyl methacrylate | 27 | 27 | 27 | 28 |
| Styrene | 29 | 29 | 29 | 30 |
| Acrylic ester | Butyl acrylate | Lauryl acrylate | 2-ethyl hexly acrylate | |
|  | 2 | 2 | 2 | 0 |

The graft polymers obtained were designated G-5-1 through G-5-4. Test pieces were prepared by forming mixtures of 15 parts of each graft polymer and 85 parts of vinyl chloride resin of average polymerization degree of 1100, under the same conditions as in Example 1. The physical properties were measured by using these test pieces, as shown in Table 10.

The physical properties shown in Table 10 were measured using the same methods and conditions as described in the Notes of Table 2. It can be seen from Table 10 that impact resistance was markedly improved, and workability, which corresponds to fluidity, was also enhanced by the addition of various acrylic esters. The products thus obtained with these additions compared favorably with the contrast samples, in tensile strength, transparency, and heat distortion temperature.

Table 10

| Vinyl chloride resin (parts) | 85 | 85 | 85 | Contrast 85 |
|---|---|---|---|---|
| Graft polymer(parts) | G-5-1 15 | G-5-2 15 | G-5-3 15 | G-5-4 15 |
| Impact resistance (23° C) (Kg.cm/cm$^2$) (−30° C) | 68.4 9.1 | 71.6 8.3 | 63.7 10.4 | 23.9 6.0 |
| Tensile strength (Kg/cm$^2$) (23° C) | 479 | 473 | 471 | 485 |
| Elongation (%) (23° C) | 175 | 180 | 182 | 170 |
| Heat distortion temperature (° C) | 67.5 | 66.3 | 66.1 | 67.4 |
| Transparency (%) | 57.5 | 57.4 | 57.2 | 56.9 |
| Fluidity (cm$^3$/sec) | 0.95×10$^{-2}$ | 0.97×10$^{-2}$ | 0.99×10$^{-2}$ | 0.92×10$^{-2}$ |

EXAMPLE 6

The products obtained with addition of butyl acrylate, and the contrast sample were formed by an extrusion method. These extruded products were compared for impact strength. The graft polymers were prepared from components shown in Table 11.

Table 11

| Components(parts) | Graft polymers G-6-1 | Contrast G-6-2 |
|---|---|---|
| Polybutadiene (particle diameter 0.3μ) | 47 | 47 |
| Methyl methacrylate | 23 | 24 |
| Styrene | 28 | 29 |
| Butyl acrylate | 2 | 0 |

10 Parts of each graft polymer obtained in this way and 90 parts of vinyl chloride polymer of polymerization degree of 1050 were mixed in a mixer and were molded into 1 inch pipe by a 40 mm extruder. The impact resistance was determined by measuring the maximum height of a 9 kg load from which the load could be dropped on the pipe without breaking it. The results are given in Table 12.

Table 12

| Vinyl chloride resin (parts) | 90 | 90 | 100 |
|---|---|---|---|
| Graft Polymer(parts) | G-6-1 10 | G-6-2 10 | 0 |
| Impact resistance (20° C) (cm) (0° C) (−30° C) | 150 90 40 | 150 40 20 | 40 20 <5 |
| Molding characteristic Extrusion amount (g/min) | 130 | 115 | 105 |
| Molding characteristic Motor load (amp) | 4.7 | 4.9 | 5.1 |

As shown above, in the products obtained with such additions, the improvement in impact strength at a low temperature is obviously good, and an improvement in molding characteristic, which was compared in terms of the motor load, was also notable.

While the foregoing described illustrative embodiments of the invention, various modifications and variations thereof would be evident to one skilled in the art, and such modifications and variations are to be considered to be within the spirit and scope of this invention.

What is claimed is:

1. Composition comprising
    (A) 90 to 50 parts by weight of vinyl chloride series resin selected from the group consisting of homopolymers of vinyl chloride and copolymers of above 70 percent by weight of vinyl chloride and below 30 percent by weight of other mono olefinic monomers copolymerizable therewith, blended homogeneously with
    (B) 10 to 50 parts by weight of graft polymer obtained by polymerizing
        (i) 20 to 65 weight percent of butadiene series rubber selected from the group consisting of homopolymers of butadiene and copolymers of butadiene in major proportions and other mono olefinic monomers copolymerizable therewith in minor proportions, said rubber being contained in latex,
        (ii) 20 to 50 weight percent of vinyl aromatic hydrocarbon,
        (iii) 10 to 50 weight percent of methyl methacrylate,
        (iv) 2 to 50 weight percent of acrylic ester but no greater than the combined weight of components (ii), (iii) and (v), and
        (v) 0 to less than 10 weight percent of acrylonitrile, said weight percents being based on the combined weight of components (i), (ii), (iii), (iv) and (v).

2. Composition of claim 1, wherein said vinyl aromatic hydrocarbon comprises styrene, said rubber comprises polybutadiene, and said acrylic ester comprises butyl acrylate.

3. Composition of claim 1, wherein said rubber comprises styrene-butadiene copolymer.

4. Composition of claim 3, wherein said acrylic ester comprises lauryl acrylate.

5. Composition of claim 3, wherein said acrylic ester comprises 2-ethyl hexyl acrylate.

6. Composition of claim 1, wherein said vinyl aromatic hydrocarbon, methyl methacrylate, acrylic ester and acrylonitrile are first mixed together before polymerizing with said rubber.

7. Composition of claim 1, wherein said vinyl aromatic hydrocarbon, methyl methacrylate, acrylic ester and acrylonitrile are added separately during polymerization with said rubber.

8. Composition of claim 1, wherein said vinyl aromatic hydrocarbon comprises 28.6 to 57.1 percent by weight of the total mixing monomers grafted to said rubber; said methyl methacrylate comprises 14.3 to 46.5 percent by weight of said total mixing monomers; said acrylic ester comprises 3.45 to 50 percent by weight of said total mixing monomers and said acrylonitrile comprises 0 to 40 percent by weight of said total mixing monomers.

9. Composition of claim 1, wherein said acrylic ester comprises from 2 to 30 percent by weight of said graft polymer.

10. The composition of claim 1, wherein said acrylic ester is methyl acrylate, ethyl acrylate, butyl acrylate, 2-ethyl hexyl acrylate, octyl acrylate or mixtures thereof.

11. Composition consisting essentially of
(A) 90 to 50 parts by weight of vinyl chloride series resin selected from the group consisting of homopolymers of vinyl chloride and copolymers of above 70 percent by weight of vinyl chloride and below 30 percent by weight of other mono olefinic monomers copolymerizable therewith, blended homogeneously with
(B) 10 to 50 parts by weight of graft polymer obtained by polymerizing components consisting essentially of
(i) 20 to 65 weight percent of butadiene series rubber selected from the group consisting of homopolymers of butdiene and copolymers of butadiene in major proportions and other mono olefinic monomers copolymerizable therewith in minor proportions, said rubber being contained in latex,
(ii) 20 to 50 weight percent of vinyl aromatic hydrocarbon,
(iii) 10 to 50 weight percent methyl methacrylate, and
(iv) 2 to 50 weight percent of acrylic ester but no greater than the combined weight of components (ii), (iii).

12. Composition of claim 11, wherein said vinyl aromatic hydrocarbon comprises styrene, said rubber comprises polybutadiene, and said acrylic ester comprises butyl acrylate.

13. Composition of claim 11, wherein said rubber comprises styrene-butadiene copolymer.

14. Composition of claim 13, wherein said acrylic ester comprises lauryl acrylate.

15. Composition of claim 13, wherein said acrylic ester comprises 2-ethyl hexyl acrylate.

16. Composition of claim 11, wherein said vinyl aromatic hydrocarbon, methyl methacrylate, acrylic ester and acrylonitrile are first mixed together before polymerizing with said rubber.

17. Composition of claim 11, wherein said vinyl aromatic hydrocarbon, methyl methacrylate, acrylic ester are added separately during polymerization with said rubber.

18. Composition of claim 11, wherein said vinyl aromatic hydrocarbon comprises 28.6 to 57.1 percent by weight of the total mixing monomers grafted to said rubber; said methyl methacrylate comprises 14.3 to 46.5 percent by weight of said total mixing monomers; said acrylic ester comprises 3.45 to 50 percent by weight of said total mixing monomers.

19. The composition of claim 11, wherein said acrylic ester comprises from 2 to 30 percent by weight of said graft polymer.

20. Composition of claim 11, wherein said acrylic ester is methyl acrylate, ethyl acrylate, butyl acrylate, 2-ethyl hexyl acrylate, octyl acrylate or mixtures thereof.

* * * * *